US008547968B2

(12) United States Patent
Epley

(10) Patent No.: US 8,547,968 B2
(45) Date of Patent: *Oct. 1, 2013

(54) METHODS, APPARATUS AND COMPUTER PROGRAM PRODUCTS FOR ASSOCIATING LOCAL TELEPHONE NUMBERS WITH EMERGENCY PHONE CALLS IN A PACKET SWITCHED TELEPHONE SYSTEMS

(75) Inventor: Robert Epley, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,080

(22) Filed: Jul. 2, 2012

(65) Prior Publication Data

US 2012/0269187 A1  Oct. 25, 2012

Related U.S. Application Data

(63) Continuation of application No. 12/534,302, filed on Aug. 3, 2009, now Pat. No. 8,223,750, which is a continuation of application No. 10/842,491, filed on May 10, 2004, now Pat. No. 7,586,902.

(51) Int. Cl.
*H04L 12/66* (2006.01)
*H04M 11/04* (2006.01)

(52) U.S. Cl.
USPC ........... 370/352; 370/237; 370/260; 370/356; 370/401; 379/45; 379/211.02; 379/215.01; 379/219; 455/436; 713/153

(58) Field of Classification Search
USPC ........... 370/237, 260, 352, 356, 401; 379/45; 379/211.02, 215.01, 219; 455/436; 713/153
See application file for complete search history.

(56) References Cited

U.S. PATENT DOCUMENTS

| | | | |
|---|---|---|---|
| 6,490,451 B1 * | 12/2002 | Denman et al. | 455/436 |
| 6,563,910 B2 | 5/2003 | Menard et al. | |
| 6,570,855 B1 * | 5/2003 | Kung et al. | 370/237 |
| 6,633,635 B2 * | 10/2003 | Kung et al. | 379/215.01 |
| 6,633,754 B1 | 10/2003 | Raith | 455/404.1 |
| 6,665,611 B1 | 12/2003 | Oran et al. | |
| 6,671,262 B1 * | 12/2003 | Kung et al. | 370/260 |
| 6,678,265 B1 * | 1/2004 | Kung et al. | 370/352 |
| 6,678,357 B2 | 1/2004 | Stumer et al. | 379/45 |
| 6,680,935 B1 * | 1/2004 | Kung et al. | 370/352 |
| 6,687,360 B2 * | 2/2004 | Kung et al. | 379/211.02 |
| 6,690,675 B1 * | 2/2004 | Kung et al. | 370/401 |
| 6,728,239 B1 * | 4/2004 | Kung et al. | 370/352 |
| 6,775,273 B1 * | 8/2004 | Kung et al. | 370/356 |
| 6,795,543 B1 * | 9/2004 | Cartier et al. | 379/219 |
| 6,798,772 B2 | 9/2004 | Bergman et al. | |
| 6,816,469 B1 * | 11/2004 | Kung et al. | 370/260 |
| 6,826,173 B1 * | 11/2004 | Kung et al. | 370/352 |

(Continued)

*Primary Examiner* — Gerald Gauthier
(74) *Attorney, Agent, or Firm* — Myers Bigel Sibley & Sajovec

(57) ABSTRACT

A packet switched telephone system includes a packet switched routing apparatus. The packet switched routing apparatus selectively associates a local telephone number with a phone call based on a called telephone number, and routes the phone call based on the called telephone number. The local telephone number may be substituted for a calling telephone number when the called telephone number corresponds to a predefined number, such as an emergency number. When the called telephone number corresponds to an emergency number, the phone call may be routed with the substituted local telephone number to a Public Safety Access Point (PSAP) that services the local area of the subscriber.

20 Claims, 2 Drawing Sheets

(56) References Cited

U.S. PATENT DOCUMENTS

| | | | |
|---|---|---|---|
| 6,836,478 B1* | 12/2004 | Huang et al. | 370/352 |
| 6,876,736 B2 | 4/2005 | Lamy et al. | 379/211.01 |
| 6,889,321 B1* | 5/2005 | Kung et al. | 713/153 |
| 6,917,610 B1* | 7/2005 | Kung et al. | 370/352 |
| 6,922,565 B2 | 7/2005 | Rhodes et al. | 455/456.1 |
| 6,937,713 B1* | 8/2005 | Kung et al. | 379/211.02 |
| 6,940,950 B2 | 9/2005 | Dickinson et al. | 379/45 |
| 6,947,527 B2 | 9/2005 | Clark, Jr. et al. | |
| 6,963,557 B2 | 11/2005 | Knox | |
| 6,968,044 B2* | 11/2005 | Beason et al. | 379/45 |
| 7,027,564 B2 | 4/2006 | James | 379/37 |
| 7,042,985 B1 | 5/2006 | Wright | |
| 7,075,918 B1* | 7/2006 | Kung et al. | 370/352 |
| 7,120,139 B1* | 10/2006 | Kung et al. | 370/352 |
| 7,126,472 B2 | 10/2006 | Kraus et al. | |
| 7,127,044 B1 | 10/2006 | Becker et al. | |
| 7,177,397 B2 | 2/2007 | McCalmont et al. | |
| 7,177,399 B2 | 2/2007 | Dawson et al. | 379/45 |
| 7,180,889 B1* | 2/2007 | Kung et al. | 370/352 |
| 7,207,846 B2 | 4/2007 | Caveney et al. | |
| 7,251,317 B1 | 7/2007 | Robbins et al. | |
| 7,260,186 B2 | 8/2007 | Zhu et al. | |
| 7,289,489 B1* | 10/2007 | Kung et al. | 370/352 |
| 7,330,464 B2 | 2/2008 | Brouwer et al. | |
| 7,340,262 B1 | 3/2008 | Gillespie et al. | |
| 7,366,157 B1 | 4/2008 | Valentine et al. | |
| 7,443,965 B2 | 10/2008 | Blossom et al. | |
| 7,453,990 B2 | 11/2008 | Welenson et al. | |
| 7,586,902 B2* | 9/2009 | Epley | 370/352 |
| 8,218,527 B2* | 7/2012 | Kung et al. | 370/352 |
| 8,223,750 B2* | 7/2012 | Epley | 370/352 |
| 2003/0152210 A1 | 8/2003 | Delaney et al. | |
| 2003/0174825 A1 | 9/2003 | Aldridge et al. | 379/207.15 |
| 2004/0096042 A1 | 5/2004 | Orwick et al. | |
| 2004/0190497 A1 | 9/2004 | Knox | |
| 2005/0135569 A1 | 6/2005 | Dickinson et al. | |
| 2005/0201362 A1* | 9/2005 | Klein et al. | 370/352 |
| 2005/0249193 A1* | 11/2005 | Epley | 370/352 |
| 2005/0249196 A1 | 11/2005 | Ansari et al. | |
| 2007/0004435 A1 | 1/2007 | Dwyer et al. | |
| 2007/0149045 A1 | 6/2007 | Caveney et al. | |
| 2008/0002669 A1 | 1/2008 | O'Brien et al. | |
| 2009/0290577 A1* | 11/2009 | Epley | 370/352 |
| 2012/0269187 A1* | 10/2012 | Epley | 370/352 |

* cited by examiner

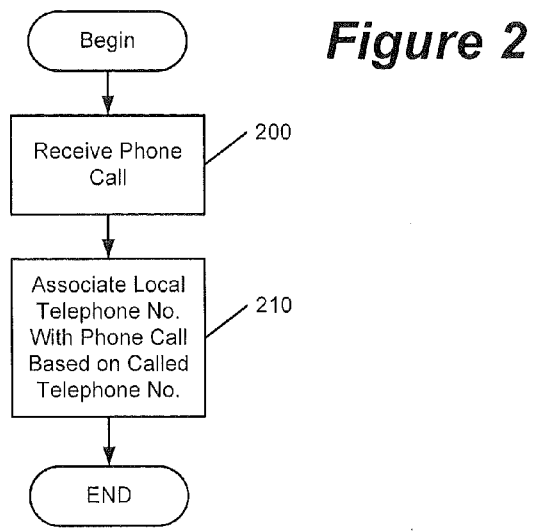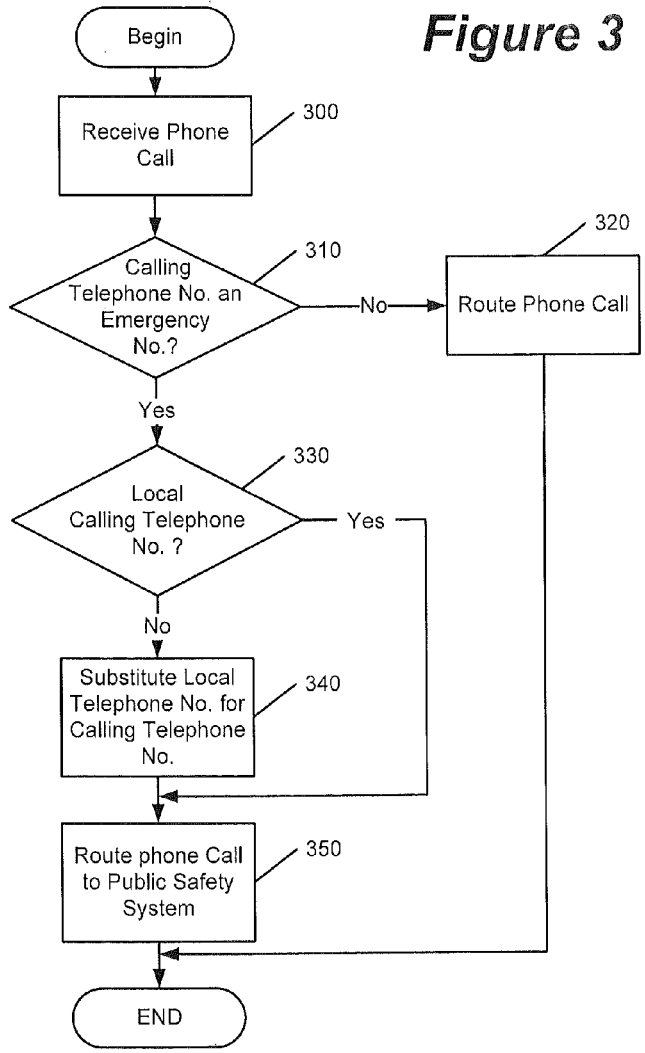

METHODS, APPARATUS AND COMPUTER PROGRAM PRODUCTS FOR ASSOCIATING LOCAL TELEPHONE NUMBERS WITH EMERGENCY PHONE CALLS IN A PACKET SWITCHED TELEPHONE SYSTEMS

REFERENCE TO PRIORITY APPLICATIONS

This application is a continuation of U.S. patent application Ser. No. 12/534,302, filed Aug. 3, 2009 now U.S. Pat. No. 8,223,750, which is a continuation of U.S. patent application Ser. No. 10/842,491, filed May 10, 2004, now U.S. Pat. No. 7,586,902, the disclosures of which are hereby incorporated herein by reference as if set forth in its entirety.

FIELD

The present invention generally relates to the field of switched telephony, and more particularly to apparatus, methods, and computer program products for providing voice communications over a packet switched network, such as the Internet.

BACKGROUND

The Internet has become a mainstream network for communicating not just data, such as email and pictures, but also for providing real-time bi-directional voice communications. Voice-Over-Internet-Protocol (VoIP) is an industry standard that has evolved to enable users to place phone calls through the Internet, instead of through the Public Switched Telephone Network (PSTN). A conventional phone may now be connected to the Internet using an interface device that converts analog phone signals to digital signals that can be communicated through the Internet. A phone call may thereby be communicated through the Internet to a VoIP provider, who converts the call back to an analog signal and places the call through a PSTN that is local to the called phone. A user can thereby dial a telephone number in a conventional manner and have the call routed through the Internet, instead of through a PSTN.

However, some telephone services may only be available to users who make calls through a PSTN, and may not be available if the calls are instead made through the Internet. For example, when a user places a call to an emergency number, such as a "911" call, through a PSTN, the emergency call is routed to a Public Safety Answering Point (PSAP). The location of the caller and the phone number of the calling phone may be automatically communicated to a PSAP operator, who can then route the call to the proper emergency service provider.

Users who subscribe to VoIP services may elect to be assigned a telephone number that is not local to that user's local geographic rate center (i.e., a foreign telephone number). For example, a user who resides in Atlanta, Ga., may elect to have a telephone number that is local to Chicago, Ill. Accordingly, a VoIP telephone number may be forwarded to a PSAP that is not local to a caller, and/or it may not provide useful information on the location of a caller.

SUMMARY

Various embodiments of the present invention provide a packet switched telephone system that includes a packet switched routing apparatus that is configured to selectively associate a local telephone number with a phone call based on a called telephone number, and is configured to route the phone call based on the called telephone number. In some further embodiments of the present invention, the local telephone number is substituted for a calling telephone number when the called telephone number corresponds to a predefined number, such as an emergency number. For example, when the called telephone number corresponds to an emergency number, the phone call may be routed with the substituted local telephone number to a Public Safety Access Point (PSAP).

Accordingly, in some embodiments of the present invention, when a phone call is made to an emergency telephone number, a local telephone number may be associated with the phone call as the calling telephone number. The phone call may then be routed based on the local telephone number to a portion of a public safety system that services the local area of a subscriber (i.e., a PSAP local to the subscriber). The location of the subscriber may be automatically retrieved based on the local telephone number for use by emergency personnel. A subscriber may thereby call an emergency number from a non-local packet switched telephone number, but have the emergency call routed to a local public safety system with the subscriber's location information being retrieved in an automated manner.

In some other further embodiments of the present invention, the packet switched routing apparatus includes a VoIP server that associates a local telephone number and a packet switched telephone number with a subscriber. The VoIP server routes the phone call with the local telephone number as the calling telephone number when the called telephone number corresponds to a predetermined number. The VoIP server routes the phone call with the packet switched telephone number as the calling telephone number when the called telephone number does not correspond to the predetermined number.

In some other further embodiments of the present invention, the packet switched routing apparatus includes a soft switch that associates a local telephone number and a packet switched telephone number with a subscriber. The soft switch routes the phone call with the local telephone number as the calling telephone number when the called telephone number corresponds to a predetermined number. The soft switch routes the phone call with the packet switched telephone number as the calling telephone number when the called telephone number does not correspond to the predetermined number.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which:

FIG. 2 is a flow chart illustrating operations for routing phone calls in a packet switched telephone system according to various embodiments of the present invention; and FIG. 3 is another flow chart illustrating operations for routing phone calls in a packet switched telephone system according to various embodiments of the present invention.

DETAILED DESCRIPTION

Figure 1:
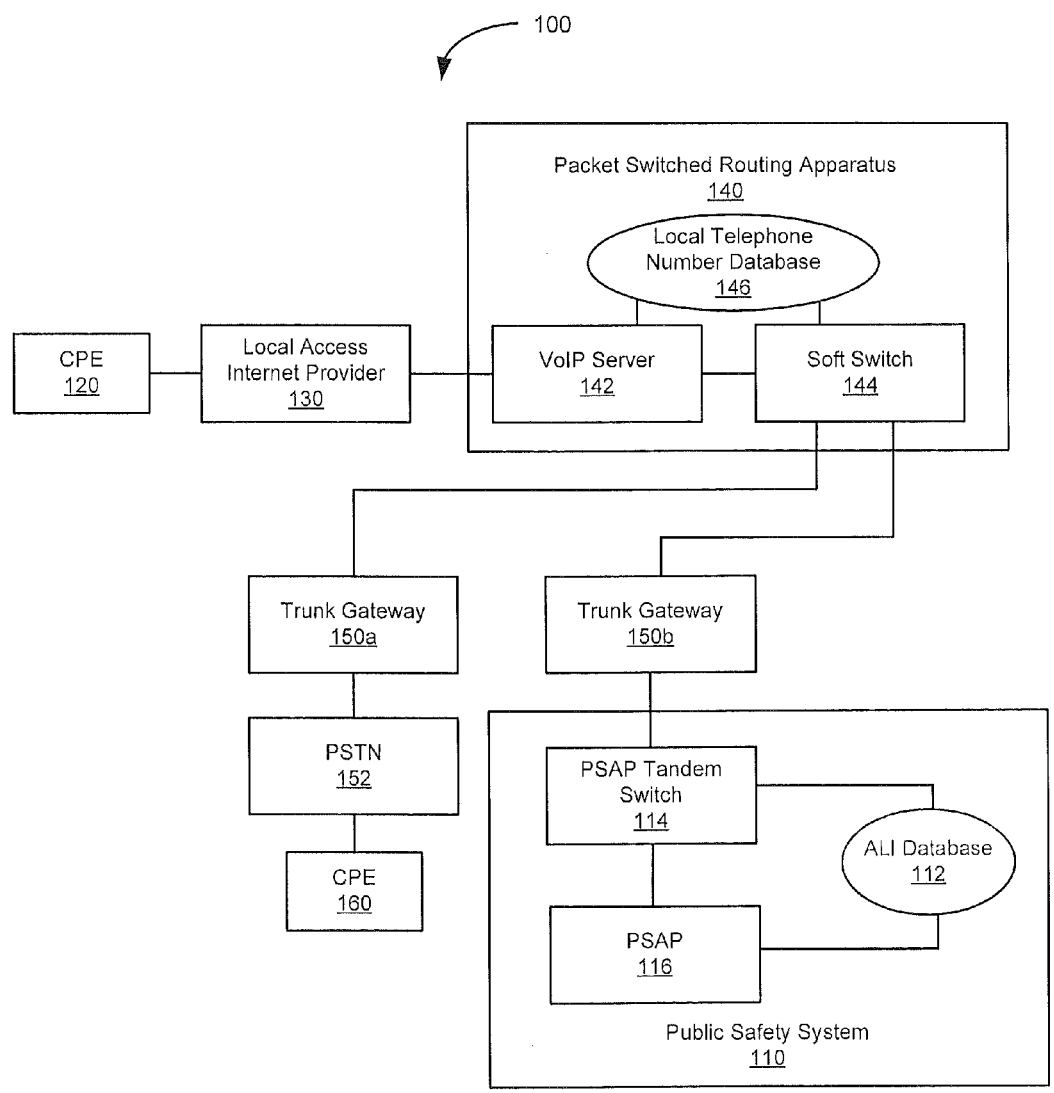
FIG. 1 is a block diagram of a packet switched telephone system that routes calls to a public safety system according to various embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus or device. More specific examples (a nonexhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described below with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

FIG. 1 is a block diagram of packet switched telephone system 100 that routes phone calls through a packet switched network to consumer premises equipment (CPE) and to a public safety system 110 according to various embodiments of the present invention. The exemplary packet switched telephone system 100 includes consumer premises equipment (CPE) 120 and 160, a local access Internet provider 130, a packet switched routing apparatus 140, and trunk gateways 150a-b.

The packet switched telephone system 100 allows phone calls to be initiated and/or received via the CPE 120 through a packet switched network, which for purposes of illustration only is referred to as the Internet, and such phone calls can be referred to as Voice Over Internet Protocol (VoIP) phone calls. The CPE 120 may be a computer with a microphone, speaker, and software that is configured to convert voice to/from a digital format that can be routed through the Internet. Alternatively, the CPE 120 may be a conventional phone that is connected through a Voice Over Internet Protocol (VoIP) access device to the Internet.

The local access Internet provider 130 provides a local interface between the CPE 120 and the packet switched routing apparatus 140. The local access Internet provider 130 may be, for example, a local telephone company that provides access to the Internet through a dial-up connection and/or through a digital subscriber line (DSL), a cable TV/communications company that provides a cable modem connection to the Internet, and/or a wireless operator that provides cellular data communications to the Internet over a wireless interface.

To setup VoIP services, a subscriber registers with a VoIP service provider and is assigned one or more packet switched telephone numbers. A subscriber can request packet switched telephone numbers that are local to the subscriber (e.g., the number is local to the subscriber's local geographic rate center) and/or that are not local to the subscriber. For example, a subscriber may reside in Atlanta, Ga., and may request packet switched telephone numbers that are local to New York City, N.Y. and to San Diego, Calif., both of which are not local to the subscriber's Atlanta Ga. location.

When a subscriber requests only non-local telephone numbers, the subscriber is also assigned a local telephone number that is associated with the location of the subscriber (e.g., a telephone number having an area code and/or other prefix that is associated with the subscriber's local geographic rate center, such as Atlanta, Ga.). For example, when a subscriber does not request a local packet switched telephone number, a VoIP service provider may look-up an available local telephone number and assign it to the subscriber. The VoIP service provider may not make the subscriber aware of the assigned local telephone number and/or it may take steps to prevent it from being used by a subscriber to initiate phone calls.

The assigned local telephone number does not need to be a callable telephone number, for example it may be a telephone number that is reserved or otherwise not usable for placing a call from the subscriber's location. Moreover, the assigned local telephone number may not be unique to a particular subscriber, and may instead be associated with a geographic area, such as a building or city block. Assigning local telephone numbers that are not necessarily unique to a subscriber may conserve the number of assigned telephone numbers, but may result in a corresponding decrease in the accuracy with which the assigned telephone number can be used to determine the location of a subscriber.

The location of the subscriber (e.g., street address and/or GPS coordinates) and the local telephone number, which may be a local packet switched telephone number requested by a subscriber or local telephone number assigned by the VoIP service provider, are provided to the public safety system 110. The public safety system 110 may store the local telephone number and location in an automatic location information (ALI) database 112. The ALI database 112 may be, for example, a database that is presently available from Intrado Inc.

The packet switched routing apparatus 140 routes phone calls based on the called telephone number (i.e., the telephone number to which the call is directed). For example, it may route a phone call from the CPE 120 through the trunk gateway 150a and a PSTN 152, which includes a termination line for the called telephone number, to the CPE 160. The CPE 160 may be a conventional plain old telephone system (POTS) telephone.

When the called telephone number is a predetermined number, such as "911" or another emergency number, the packet switched routing apparatus 140 determines whether the calling telephone number (i.e., the telephone number from which the call originated) is local to the subscriber and, if it is local, it routes the phone call with the calling telephone number. When the calling telephone number is not local to the subscriber, the packet switched routing apparatus 140 associates a local telephone number for the subscriber with the phone call and routes the phone call. The local telephone number may be substituted for, and used as, the calling telephone number associated with the phone call. The local telephone number may be a local packet switched telephone number that was requested by a subscriber or it may be a local telephone number assigned by the VoIP service provider when the subscriber did not request a local packet switched telephone number.

When the called telephone number is an emergency number, the packet switched routing apparatus 140 routes the phone call based on the called telephone number and the calling telephone number through the trunk gateway 150b to a portion of the public safety system 110 that services the local area of the subscriber. The phone call can be routed in the public safety system 110 through a public safety access point (PSAP) tandem switch 114, which obtains routing information from the ALI database 112 and routes the phone call to a PSAP 116 that services the local area of the subscriber. The PSAP 116 obtains the subscriber's location information from the ALI database 112 based on the calling telephone number, which may allow emergency personnel to determine the location of a caller.

The packet switched routing apparatus 140 can include a VoIP server 142 and a soft switch 144. The VoIP server 142 may be, for example, a BroadWorks platform by BroadSoft, and can include subscriber information used for routing calls to/from subscribers. The soft switch 144 may be, for example, a Siemens hiQ 8000 Softswitch, and can provide a bridge between the Internet and the trunk gateways 150a-b and/or other equipment in a public switched telephone network. The VoIP server 142 and/or the soft switch 144 may perform one or more of the operations for checking whether a called telephone number corresponds to a predetermined number, determining whether the calling telephone number is local to a subscriber, and/or associating a local telephone number with a phone call. For example, the VoIP server 142 and/or the soft switch 144 may associate a local telephone number and a packet switched telephone number with a subscriber, and route a phone call with the local telephone number or with the packet switched telephone number as a calling telephone number based on whether the called telephone number corresponds to a predetermined number. The local telephone numbers and a packet switched telephone numbers associated with subscribers may be retained in a subscriber telephone number database 146 that can be queried, or otherwise accessed, by the VoIP server 142 and/or the soft switch 144.

Accordingly, in some embodiments of the present invention, when a phone call is made to an emergency telephone number, a local telephone number is associated with the phone call as the calling telephone number. The phone call may then be routed based on the local telephone number to a portion of a public safety system that services the local area of the subscriber, and the location of the subscriber may be automatically retrieved and used by emergency personnel. A VoIP subscriber may thereby call an emergency number from a non-local packet switched telephone number, but have the emergency call routed to a local public safety system with the subscriber's location information being retrieved in an automated manner.

Although FIG. 1 illustrates an exemplary packet switched telephone system 100, it will be understood that the present invention is not limited to such a configuration, but is intended instead to encompass any configuration capable of carrying out the operations described herein. For example, although only two CPEs 120 and 160 and two trunk gateways 150a-b have been shown for illustration purposes, it will be understood that the packet switching routing apparatus 140 would generally route phone calls to/from thousands of VoIP subscribers through numerous trunk gateways. Moreover, it is to be understood that although the packet switched telephone system 100 has been described in the context of the Internet, it may be used to route phone calls through any packet switched network. Moreover, CPEs may communicate with a local access Internet provider and/or a packet switched routing apparatus across a wireless interface such as, for example, a cellular interface (e.g., General Packet Radio System (GPRS), Enhanced Data Rates for Global Evolution (EDGE), Global System for Mobile Communications (GSM)), a wireless local area network interface (e.g., WLAN, IEEE 802.11), a Bluetooth interface, another RF communication interface, and/or an optical interface.

FIG. 2 is flow chart of operations for routing phone calls in a packet switched telephone system according to various embodiments of the present invention. At Block 200, a phone call is received. At Block 210, a local telephone number is associated with a phone call based on the called telephone number, and the phone call is routed based on the called telephone number. Further embodiments of these operations are described now with reference to FIG. 3.

At Block 300, a phone call is received at, for example, the packet switched routing apparatus 140 shown in FIG. 1. At Block 310, a decision is made as to whether the called telephone number corresponds to an emergency number (e.g., "911"). When the called telephone number does not correspond to an emergency number, the phone call is routed at Block 320 based on the called telephone number. When the called telephone number corresponds to an emergency number, a further determination is made at Block 330 as to whether the calling telephone number is local to the subscriber who is associated with the phone call. When the calling telephone number is determined to be local (at Block 330), then at Block 350 the phone call is routed based on the calling telephone number and the called telephone number to a public safety system that services the geographic area of the subscriber.

When the calling telephone number is determined to be non-local (at Block 330), then at Block 340 a local telephone number is substituted for the calling telephone number. The local telephone number may be another telephone number that was requested by the subscriber, such as when a VoIP subscriber requests a local packet switched telephone number and one or more non-local packet switched telephone numbers, or it may be a local telephone number that is assigned to the subscriber by, for example, a VoIP service provider. At Block 340, the local telephone number is substituted for the calling telephone number. The phone call is then routed at Block 350 with the substituted local telephone number to the public safety system that services the geographic area of the subscriber, which is determined based on the substituted calling telephone number.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for registering subscribers with a voice over internet protocol service, the method comprising:
   receiving a request, from a subscriber, for a packet switched telephone number that is not local to a local geographic rate center of the subscriber; and
   assigning the subscriber a local telephone number that is local to the subscriber responsive to the request for the packet switched telephone number that is not local, such that the local telephone number can be substituted for the packet switched telephone number that is not local by a voice over internet protocol server that is configured to route a phone call that is directed to a public safety access point so that the phone call that is directed to the public safety access point is properly routed to a local public safety system.

2. The method of claim 1, wherein assigning the subscriber a local telephone number further comprises assigning the subscriber a local telephone number having an area code associated with the local geographic rate center of the subscriber.

3. The method of claim 1, wherein assigning the subscriber a local telephone number comprises assigning the subscriber a local telephone number with knowledge of the subscriber.

4. The method of claim 1, further comprising preventing the subscriber from using the local telephone number to initiate phone calls.

5. The method of claim 1, wherein the local telephone number is not a callable number.

6. The method of claim 1, wherein the local telephone number is not unique to the subscriber.

7. The method of claim 1, wherein the voice over internet protocol server is further configured to substitute the local telephone number only when a called telephone number for the phone call corresponds to an emergency number for the public safety access point.

8. A packet switched telephone system comprising:
   a voice over internet protocol server associated with a voice over internet protocol service provider configured to:
   receive a request, from a subscriber, for a packet switched telephone number that is not local to a local geographic rate center of the subscriber; and
   assign the subscriber a local telephone number that is local to the subscriber responsive to the request for the packet switched telephone number that is not local, such that the local telephone number can be substituted for the packet switched telephone number that is not local by the voice over internet protocol server that is configured to route a phone call that is directed to a public safety access point so that the phone call that is directed to the public safety access point is properly routed to a local public safety system.

9. The packet switched telephone system of claim 8, wherein the server is further configured to assign the subscriber a local telephone number having an area code associated with the local geographic rate center of the subscriber.

10. The packet switched telephone system of claim 8, wherein the server is further configures to assign the subscriber a local telephone number with knowledge of the subscriber.

11. The packet switched telephone system of claim 8, wherein the server is further configured to prevent the subscriber from using the local telephone number to initiate phone calls.

12. The packet switched telephone system of claim 8, wherein the telephone number is not a callable number.

13. The packet switched telephone system of claim 8, wherein the local telephone number is not unique to the subscriber.

14. The packet switched telephone system of claim 8, wherein the voice over internet protocol server is further configured to substitute the local telephone number only when a called telephone number for the phone call corresponds to an emergency number for the public safety access point.

15. A computer program product for registering subscribers with a voice over internet protocol service, the computer program product comprising:
   a non-transitory, computer readable storage medium having computer readable program code embodied therein, the computer readable storage medium comprising:
   computer readable program code configured to receive a request, from a subscriber, for a packet switched telephone number that is not local to a local geographic rate center of the subscriber; and
   computer readable program code configured to assign the subscriber a local telephone number that is local to the subscriber responsive to the request for the packet switched telephone number that is not local, such that the local telephone number can be substituted for the packet switched telephone number that is not local by a voice over internet protocol server that is configured to route a phone call that is directed to a public safety access point so that the phone call that is directed to the public safety access point is properly routed to a local public safety system.

16. The computer program product of claim 15, wherein the computer readable program code configured to assign further comprises computer readable program code configured to assign the subscriber a local telephone number having an area code associated with the local geographic rate center of the subscriber.

17. The computer program product of claim 15, wherein the computer readable program code configured to assign further comprises computer readable program code configured to assign the subscriber a local telephone number with knowledge of the subscriber.

18. The computer program product of claim 15, further comprising computer readable program code configured to prevent the subscriber from using the local telephone number to initiate phone calls.

19. The computer program product of claim 15, wherein the local telephone number is not a callable number.

20. The computer program product of claim 15, wherein the local telephone number is not unique to the subscriber.

* * * * *